W. W. KRUTSCH.
CUSHION WHEEL.
APPLICATION FILED SEPT. 17, 1917.
1,335,245.
Patented Mar. 30, 1920.
2 SHEETS—SHEET 2.
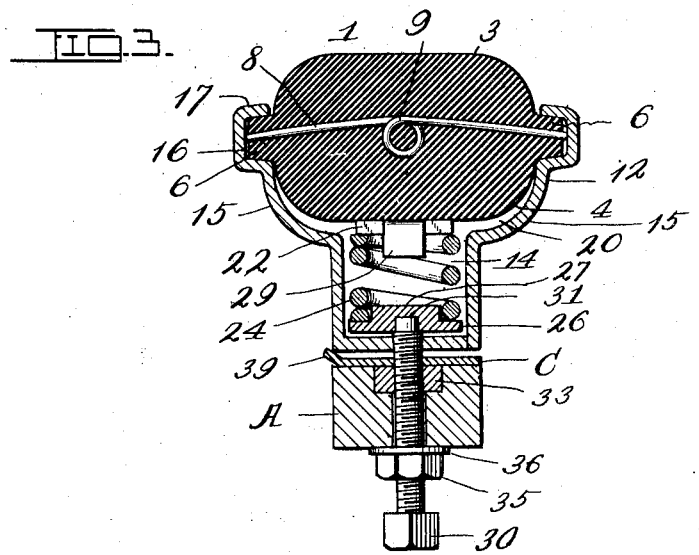
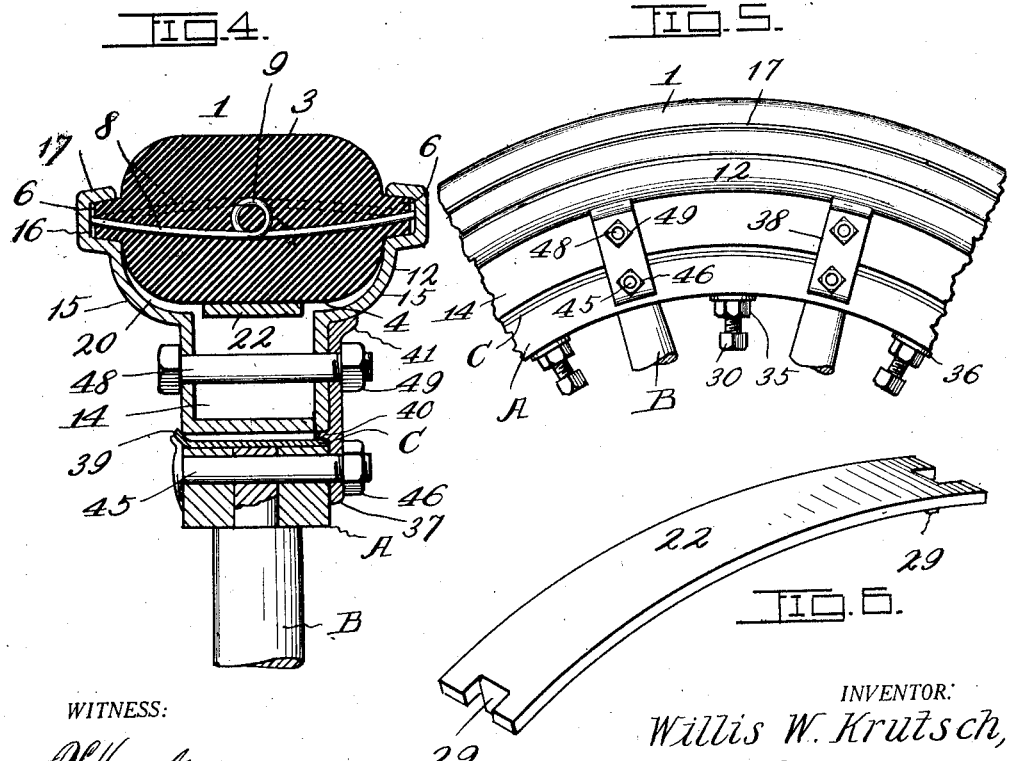
WITNESS:
R.E. Hamilton
INVENTOR:
Willis W. Krutsch,
BY
F. G. Fischer,
ATTORNEY.

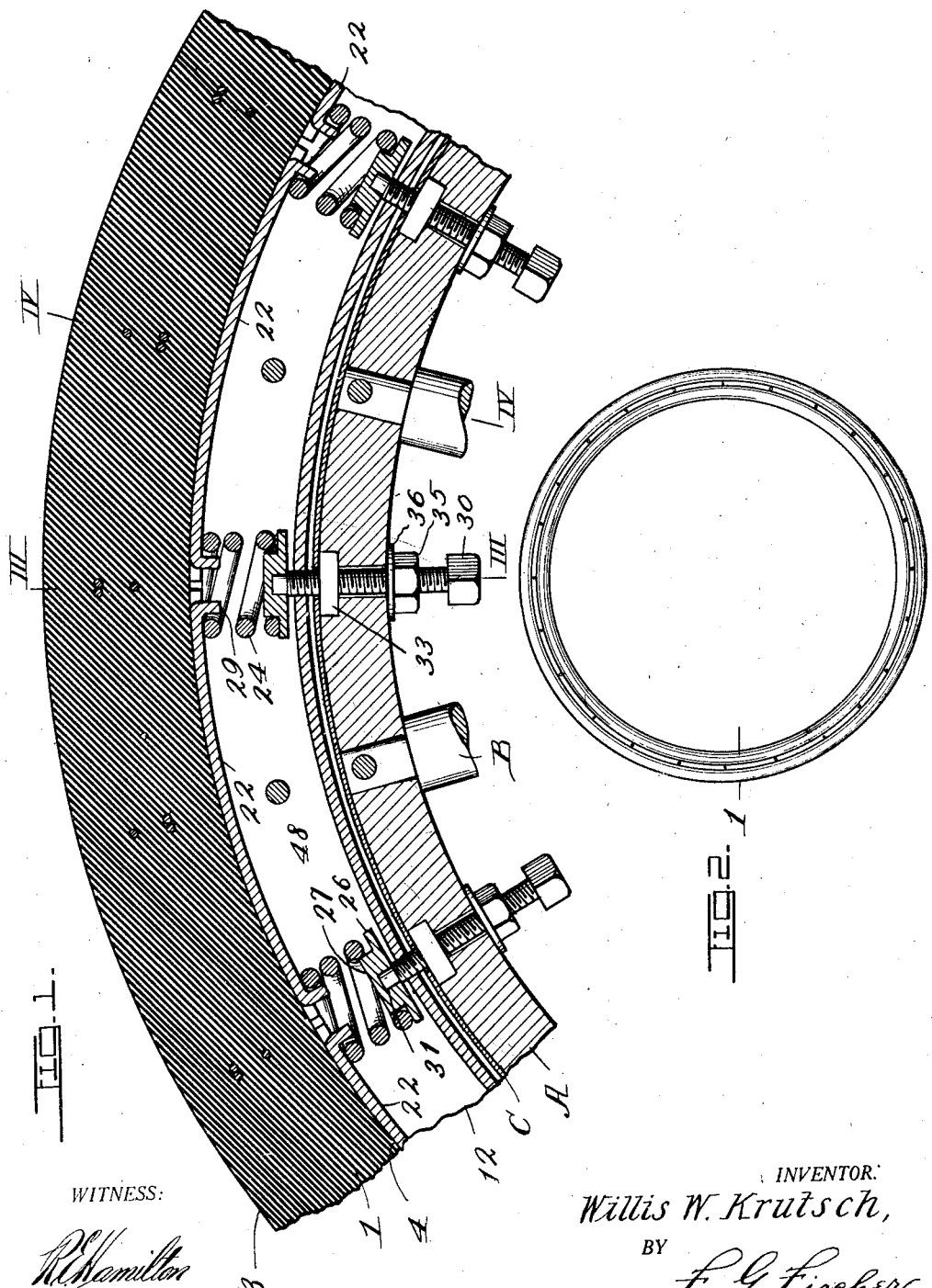

UNITED STATES PATENT OFFICE.

WILLIS W. KRUTSCH, OF COFFEYVILLE, KANSAS, ASSIGNOR OF ONE-HALF TO WILLIAM M. HARRISON, OF MUSKOGEE, OKLAHOMA.

CUSHION-WHEEL.

1,335,245.  Specification of Letters Patent.  Patented Mar. 30, 1920.

Application filed September 17, 1917. Serial No. 191,738.

*To all whom it may concern:*

Be it known that I, WILLIS W. KRUTSCH, a citizen of the United States, residing at Coffeyville, in the county of Montgomery and State of Kansas, have invented certain new and useful Improvements in Cushion-Wheels, of which the following is a specification.

My invention relates to a cushion wheel, and one object is the provision of means whereby the resiliency of the tire of the wheel can be regulated to accommodate the load to be carried and the use to which the wheel is to be put. For instance, when used on touring cars and other passenger vehicles where easy riding free from vibration is a desirable feature, adjustments are made to obtain the greatest resiliency, and when the tire is employed for heavy duty as when applied to a truck, adjustments are made accordingly.

A further object of the invention is the provision of a rubber tire having two treads, so that when one is worn out the tire can be reversed to bring the other tread into use.

Other objects will hereinafter appear, and in order that the invention may be fully understood, reference will now be made to the accompanying drawings, in which:

Figure 1 is broken, vertical, central section of a vehicle wheel equipped with the invention.

Fig. 2 is a side elevation of the reversible tire employed in carrying out the invention.

Fig. 3 is a cross section on line III—III of Fig. 1.

Fig. 4 is a cross section on line IV—IV of Fig. 1.

Fig. 5 is a fragmentary, side elevation of the vehicle wheel equipped with the invention.

Fig. 6 is a detail, perspective of one of a number of segments, constituting a part of the invention.

A designates a wooden felly, B the spokes and C the metallic band of an automobile wheel of usual construction.

Referring now to the various elements constituting the present invention, 1 designates a reversible, resilient tire consisting of rubber or other suitable material. Said tire has concentric surfaces 3 and 4, divided by circular beads 6 extending around the opposite sides of the tire, which latter is reinforced by transverse springs 8, having coils 9 intermediate their ends to lend resiliency thereto. As disclosed by Fig. 1, the transverse springs 8 are embedded in the tire and spaced equal distances apart with their coils alternately arranged. That is to say, one has its coil 9 extending inwardly as disclosed by Fig. 3, and the next has its coil extending outwardly as disclosed by Fig. 4.

12 designates a demountable metallic rim of the clencher type for securing the tire 1 upon the wheel. Said rim 12, generally speaking, is of U-formation in cross section and has a trough-shaped annular base 14, with outwardly and laterally curved sides 15, provided with seats 16 for the tire beads 6 and terminating in inturned, marginal flanges 17 which overlap said beads and firmly hold the tire in place. One of the sides 15 is removable, so that the tire 1 can be readily applied to or removed from the rim 12. A space 20 is left between the inner surface of the curved portions 15 and the adjacent walls of the tire 1 to allow that portion of the latter resting upon the ground to yield beneath its load until seated against said inner surface of the curved portions 15. Thus greater resiliency is obtained than if the tire were initially seated solidly against the rim as in common practice.

22 designates a plurality of segments bearing against the inner tread of the tire to yieldably-support the same clear of the inner surface of the curved portions 15 of the rim 12. Said segments 22 are held against the inner tread by cushioning means such as coil springs 24, which bear upon disks 26 having bosses 27, which project into said springs and prevent them from shifting laterally in any direction. The other ends of the coil springs 24 are held in proper relation with the ends of the segments 22 by lugs 29, bent to extend into said springs, as best shown by Figs. 1 and 3.

The tension of the coil springs 24 is regulated by set screws 30, extending through the wooden felly A, the band C and the inner periphery of the rim 12, and having their inner terminals seated in recesses 31 in the disks 26. The set screws 30 are threaded through stationary nuts 33, embedded in the wooden felly A, and said set screws 30 are secured from accidental turning by lock nuts 35 bearing against washers 36, which in turn bear against the inner periphery of the wooden felly A.

37 designates a plurality of clips for co-acting with the upturned margin 39 of the band C, in holding the metallic rim 12 firmly upon said band C. Each clip 37 has an intermediate lug 40 and an outturned terminal 41, which latter is adapted to fit against the outer surface of one of the curved sides 15 of the rim 12, to assist in supporting said side and prevent it from springing outwardly. The clips 37 are removably-secured to the wooden felly A by bolts 45 and nuts 46, and secured to the rim 12 by bolts 48 and nuts 49. The bolts 48 extend transversely through the trough-shaped base 14 of the rim 12 and prevent the opposite sides thereof from spreading apart under the load to which they are subjected. When the nuts 46 and 49 are tightened upon their respective bolts, the lugs 40 on the clips 37 are forced between the band C and the rim 12, tending to expand the latter and firmly hold it in position.

In practice, the resiliency of the device is regulated to sustain heavy loads by adjusting the set screws 30 in a manner to compress the coil springs 24, but when maximum resiliency of the device is desired said set screws 30 are adjusted to allow the springs 24 to expand, so that they will be more resilient under a load. By connecting the coil springs through the intermediacy of the segments 22, pressure applied to any portion of the tire tread will be transmitted by said segments to the springs hence the tire is yieldably and uniformly sustained throughout its inner periphery.

When one tread of the tire has worn down to a point adjacent the coils 9 of the transverse springs 8, said tire is removed from the rim 12 and turned inside out to bring its other tread into contact with the surface of a road, after which it is replaced upon the rim 12. By making the tire of solid rubber or other suitable material annoyance from puncture to which pneumatic tires are subject is effectively overcome.

From the foregoing description, it is apparent that I have produced a device embodying the advantages above enumerated, and while I have shown and described the preferred form of the invention, I reserve the right to make such changes in the construction, proportion, and arrangement of parts as properly fall within the spirit and scope of the claim.

Having thus described my invention, what I claim and desire to secure by Letters Patent, is:

A tire consisting of a resilient body portion having two concentric surfaces, circular beads on the opposite sides of said body portion intermediate the concentric surfaces, and springs spaced apart and extending transversely through the body portion and the beads.

In testimony whereof I affix my signature in the presence of two witnesses.

WILLIS W. KRUTSCH.

Witnesses:
F. G. FISCHER,
L. J. FISCHER.